Sept. 15, 1942.  A. W. KEEN  2,295,740
APPARATUS FOR FOAMING LIQUIDS
Filed Jan. 19, 1940  3 Sheets-Sheet 2
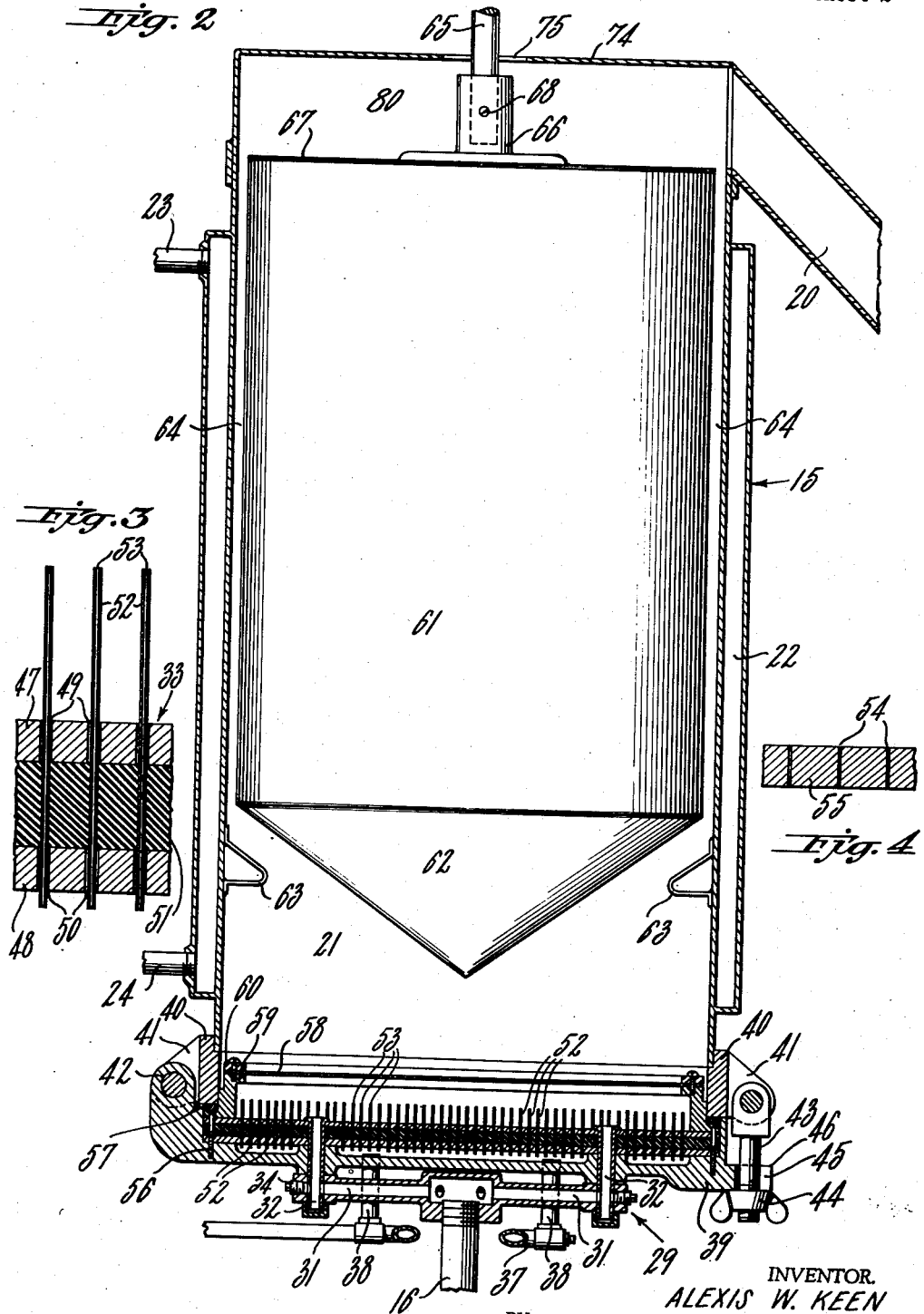
INVENTOR.
ALEXIS W. KEEN
BY
ATTORNEYS Sept. 15, 1942.          A. W. KEEN          2,295,740
APPARATUS FOR FOAMING LIQUIDS
Filed Jan. 19, 1940          3 Sheets-Sheet 3
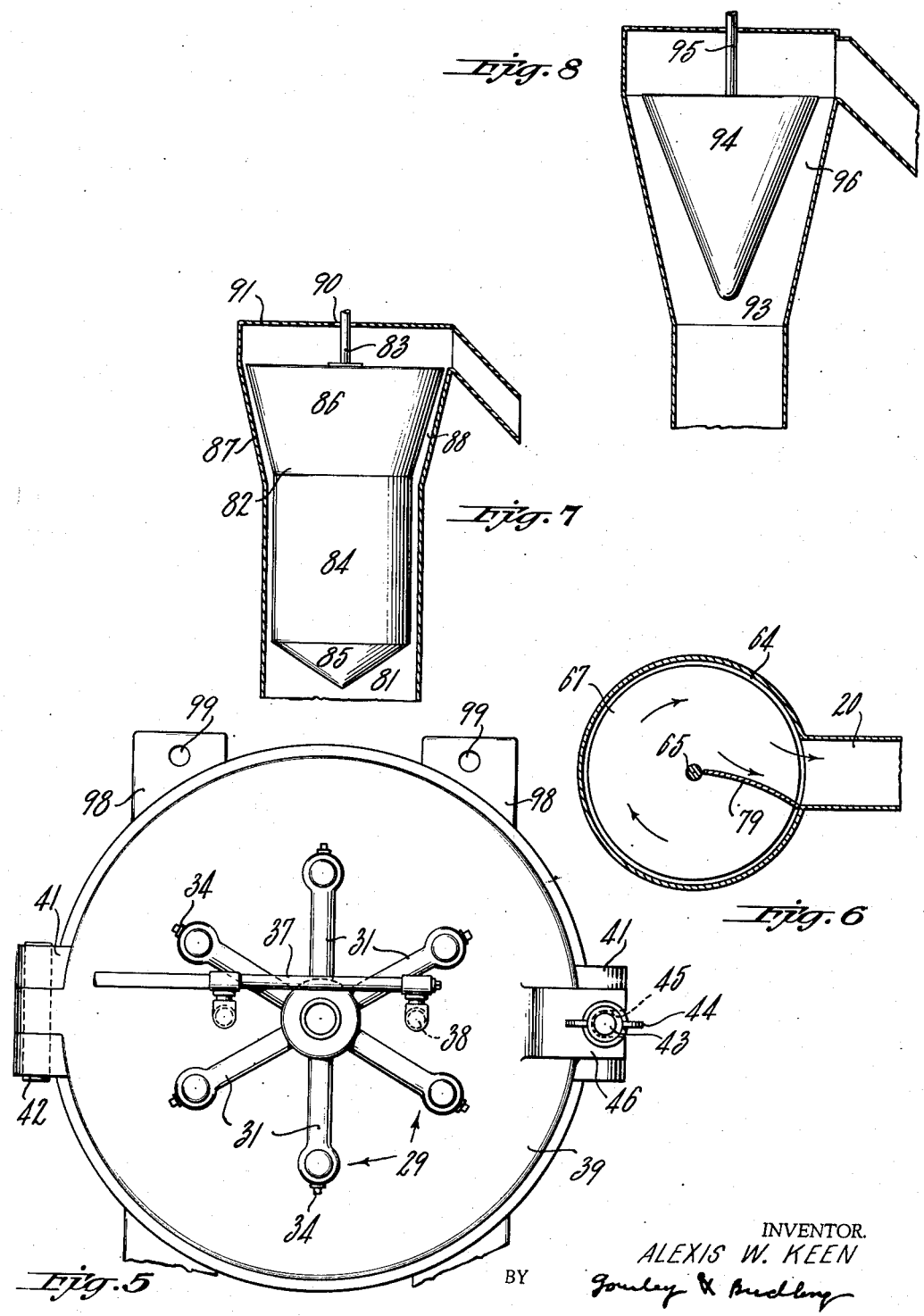
INVENTOR.
ALEXIS W. KEEN
BY
ATTORNEYS Patented Sept. 15, 1942

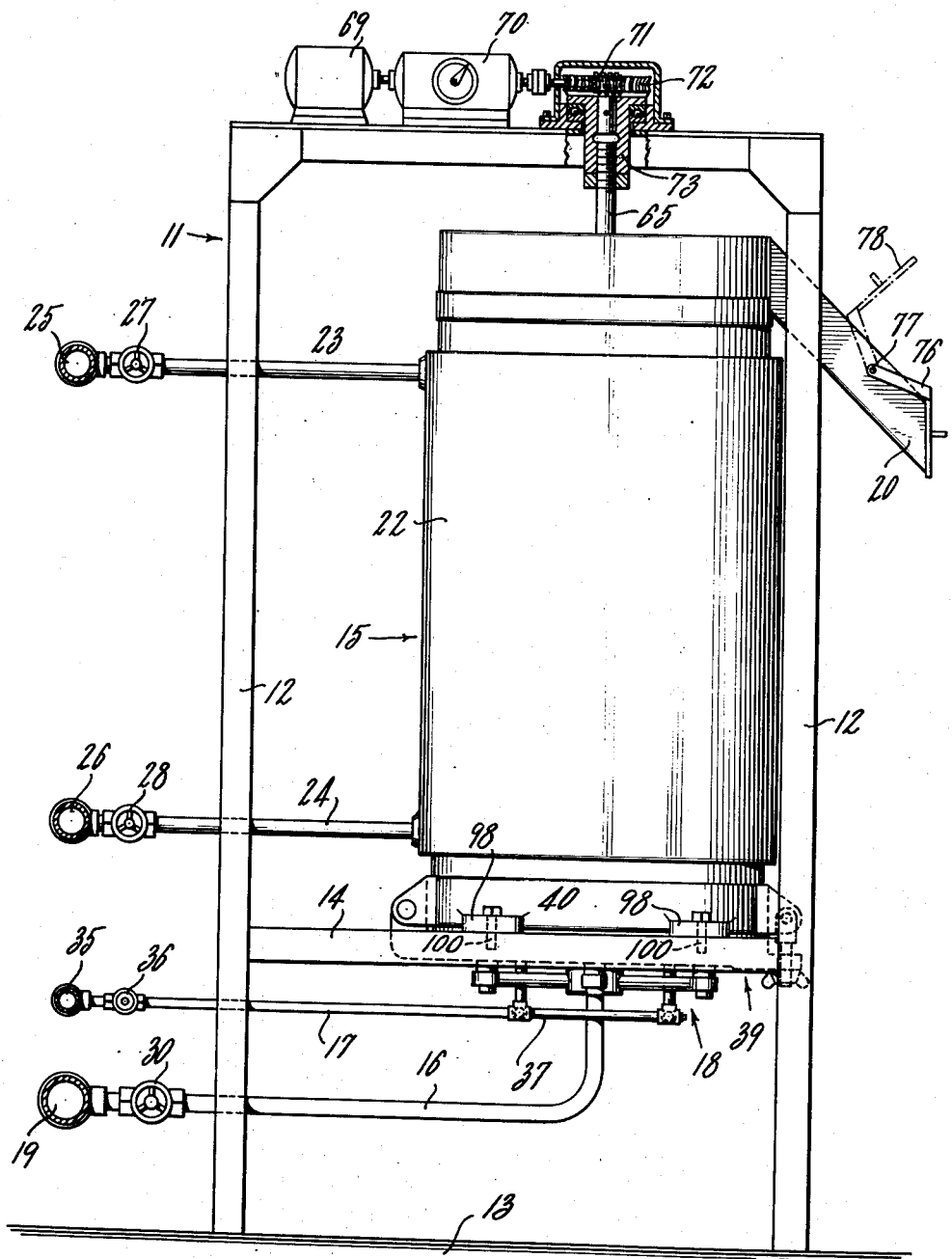

2,295,740

UNITED STATES PATENT OFFICE 2,295,740

APPARATUS FOR FOAMING LIQUIDS

Alexis W. Keen, Packanack Lake, Wayne Township, Passaic County, N. J., assignor to United States Rubber Company, New York, N. Y., a corporation of New Jersey Application January 19, 1940, Serial No. 314,677

4 Claims. (Cl. 261—93)

This invention relates to apparatus for producing a foam from a liquid and particularly for continuously foaming rubber latex.

In the past it has been the practice in manufacturing sponge rubber articles from foamed latex to prepare the latex by incorporating a soap or other foaming agent in the latex composition and to beat or whip separate successive batches of the latex compound into a foam by whipping devices which are often adaptations of the ordinary household egg beater. The former batch operations involve considerable manual manipulation, are slow of producing, and because of varying conditions produce foam of non-uniform structure and density throughout the same batch or in successive batches. Present day commercial requirements call for continuity of production, speed, uniformity of pore structure, and accurate control of the density of the latex foam produced. Due to the peculiar natural characteristics of rubber latex, such as its persistent tendency to dry or coagulate when exposed to air, heat, or agitation, especial care must be exercised in any continuous method of manufacture in which the steps necessary to foam or froth the liquid latex are carried out.

The present invention provides apparatus for continuously foaming any desired quantity of latex without interruption, for accurately controlling the density and homogeneity of the latex foam thus produced while at the same time retaining the latex foam in proper condition for further manipulation. The apparatus is adapted to the foaming or frothing of any desired foamable material having the requisite fluidity and for controlling the consistency and bubble size of the produced foam within accurately predetermined limits. It is, however, particularly well adapted to the production of latex foam since it provides for accurate physical control of the foam and the ingredients thereof throughout the entire foaming operation. The process is continuous, avoids the former disadvantages of batch operations, and permits of varying the density and pore size of the foam being produced without interrupting the process. The apparatus of the present invention has sixteen times the productive capacity of a former whipping device of similar dimensions.

In continuously feeding latex into the foaming device of the present invention, it is necessary that the pressure and rate of flow of the latex therein be maintained constant or at least at the desired value. Accordingly, means are associated with the foaming device for controlling the rate of flow of the latex and of the bubbling gas as they are introduced into a foaming chamber. The invention also contemplates the production of a foam by any desired means and the subsequent treatment of the foam to render the size of the bubbles therein and the apparent density thereof at a predetermined value. Means are also provided for controlling the temperature and humidity to which the latex foam is subjected during the processing stages in order that a homogeneous foam may be continuously produced even when exterior atmospheric or other conditions not within the control of the operator are varied.

In operation of the present invention, latex, which may previously have been compounded with a foaming agent, is introduced at controlled pressure and at a predetermined rate of flow into a foaming chamber. Air is introduced in small quantities as bubbles into the latex within the chamber to produce a foam which, ordinarily, is relatively coarse in its consistency, that is: the bubbles are either of relatively large size or are considerably variable in size, or both. The preliminary foam thus produced is then continuously subjected to a shearing action or stress, resulting from applied forces, which cause contiguous particles in adjacent portions of the body of foam to move relatively to each other in a direction parallel to the regions of mutual tangency of the foam bubbles, thus placing the foam bubbles under a disruptive tension, which may be accomplished by passing the stream of foam between two or more opposed and preferably coextensive surfaces, at least one of which is rotating or otherwise continuously moving relative to the other. The bubbles in the successive quantities of latex foam passing between these surfaces are subdivided so that the texture of the foam is rendered finer without appreciable increase in the apparent density thereof. The shearing action operates to subdivide at least the larger bubbles, and may be prolonged as desired so that considerable latitude of control of bubbles size and also of apparent density of the foam is possible.

In a preferred embodiment the apparatus may comprise generally a foaming chamber, means for introducing gas as bubbles directly into the latex within the chamber, the aerating means comprising a feeder from a gas supply and a plurality of capillary nozzles associated therewith and extending beyond the interior surface of the chamber, and shearing means associated with the chamber for stretching and subdividing gas bubbles. The shearing means preferably comprise a plurality of substantially coextensive opposed shearing surfaces spaced from each other, the distance between said surfaces being of the order of between 1/16" and 1/2" and preferably remaining constant. Means are also provided for producing relative rotary movement between the opposed surfaces, for example, by rotating one of the surfaces while the other either remains stationary or rotates in the opposite direction, as desired. Means are also provided for continuously passing a relatively coarse latex foam into one end of the space between the opposed surfaces and expelling it from the other end of that space.

In a preferred embodiment of the invention, the shearing means comprise a rotatable cylinder or other solid having a surface of revolution concentric with the interior wall of the foaming chamber together with driving means for the cylinder, the exterior of the cylinder being spaced from the interior of the chamber so as to provide the passageway for a continuous annular column of latex foam passing therebetween. Means are also provided for introducing unfoamed latex into the foamed latex in order to increase the density of the latter.

The accompanying drawings illustrate certain present preferred embodiments of the invention in which:

Fig. 1 is an elevational view of the foaming apparatus;

Fig. 2 is a central cross section of the foaming and shearing mechanism;

Fig. 3 is an enlarged cross sectional view showing a detail of the preferred aerating means;

Fig. 4 is an enlarged cross sectional view showing a detail of alternative aerating means;

Fig. 5 is a lower plan view of the foaming and shearing device;

Fig. 6 is a diagrammatic top plan view of the foaming and homogenizing mechanism;

Fig. 7 is a fragmentary cross section showing an alternative embodiment of the shearing means; and Fig. 8 is a view similar to Fig. 7 showing a further modification of the shearing means.

Referring to Fig. 1, the foaming apparatus is supported by a frame 11 comprising uprights 12 resting on the floor 13 and connected by horizontal braces 14. The principal parts of the apparatus are a foaming and shearing mechanism 15, a latex feed line 16, an air supply line 17 and a lower feeding unit 18 for introducing air and latex into the foaming unit 15. Latex is supplied under pressure from a source through a pipe 19 into the lower portion of the foaming mechanism and is there aerated to form a preliminary relatively coarse foam, whereupon it is impelled upwardly through the unit and rendered of the desired consistency by the shearing device in the upper part of the mechanism 15 until it finally emerges through a chute 20 at the top of the unit.

The foaming and shearing unit 15 comprises a foaming chamber 21 surrounded by a conditioning chamber 22 provided with inlet and outlet conduits 23 and 24 for the circulation of heating or cooling fluids which may be supplied and returned through pipes 25 and 26 provided with shut-off valves 27 and 28, respectively. Liquid latex enters the chamber 21 through a distributing spider 29 connected to the latex feed line 16 leading from the pipe 19 through a latex flow control valve 30. Each hollow arm 31 of the spider 29 is provided with an upstanding entrance pipe 32 which terminates at the upper surface of the floor 33 of the chamber 21. Plugs 34 are fitted into the ends of the spider arms 31 so that the distributor may be cleaned without disassembly.

Air or other foam-producing gas is piped from any convenient supply line 35 through the feed pipe 17 controlled by a valve 36 into a header 37 provided with inlet pipes 38 leading into the foaming unit 15 beneath the floor 33. It will be noted that the air is introduced below the floor 33 of the chamber whereas the latex enters the chamber above the floor.

The lower part of the chamber is closed by a hinged cap 39 which supports the floor 33, the header 37, and the distributing spider 29. The lower portion of the wall of the chamber 21 terminates in a heavy supporting ring 40 against which the cap 39 fits, when in closed position. Brackets 41 are provided on opposite sides of the ring 40 to hold a hinge 42 and a pivoted lock bolt 43, respectively. The lock bolt 43 is provided with a wing nut 44 which engages a slot 45 in a projecting portion 46 of the cap 39.

The floor 33 comprises a pair of metallic discs 47 and 48 (see Fig. 3), each having perforations 49 and 50 respectively in register with those of the other. Interposed between the discs is a resilient disc 51 of similar dimensions, preferably made of soft rubber and of somewhat greater thickness than the metallic discs. A number of hollow needles 52 having minute orifices 53 extend through the floor 33 and are held within the perforations in the floor by the contractive force of the rubber disc which they pierce. The upper ends of the needles extend above the upper surface of the floor so that when air or other gas is forced through the needles, it is introduced above the lower surface of the latex into the bottom of the chamber 21, but above the floor thereof. In order that the air be introduced as bubbles into the latex and not as continuous streams, extremely small holes of capillary dimensions are provided in the needles preferably of the order of .010 inch. It has been found that a satisfactory foam may be produced with a floor two feet in diameter when 1600 needles are employed, each needle projecting as a nozzle, for example, about 5/8 inch above the upper surface of the floor 33. Although it is preferable to position the orifices 53 above the level of the floor 33, it is also possible to produce a foam by merely drilling narrow holes 54 in a floor 55 as shown in Fig. 4. With this latter embodiment, especially, care must be taken to maintain the air pressure at a sufficiently high value to prevent the latex from backing down into the perforations 54 which would result in clogging the foaming unit. The discs 47, 48 and 51 comprising the floor 33 are secured to the cap 39 by a circular row of bolts 56. A gasket 57, preferably of rubber or other resilient material, surmounts the row of bolts 56 to provide a fluid-tight seal for the lower portion of the chamber 21. A foraminated or perforated plate 58 is secured at the desired distance above the orifices 53, an annular bracket 59 being held by the bolts 56 for the support thereof relative to the cap 39. The plate 58 is positioned at such a distance above the floor 33 that a preliminary foam formed at the orifices will pass therethrough on being forced upwardly. A ring plate 60 is bolted above the perforate plate to hold it in position.

The major upper portion of the chamber 21 is occupied by a cylindrical rotor 61 which preferably terminates downwardly in a conical portion 62. Stop brackets 63 are secured to the interior of the chamber 21 beneath the lower extremity of the cylindrical portion of the rotor 61 to preclude the possibility of the rotor being lowered too far into the chamber thereby preventing damage to the parts during disassembly. The rotor is of such diameter that when centered within the chamber 21, a shearing channel or annular passage 64 is defined between the exterior of the rotor and the interior of the chamber. The radial dimension or thickness of this channel is preferably of the order of one-quarter inch, but it may be as thick as one-half inch when operating with foams of relatively high viscosity, or as thin as one-sixteenth inch when shearing a low-viscosity foam. A shaft 65 extends into a socket 66 secured to the center of the upper face of the rotor, the rotor being enclosed at the top by a plate 67. A set screw 68 holds the shaft in engagement with the socket.

The shaft 65 is driven at the desired speed by suitable driving means, mounted on the frame 11, such as an electric motor 69 connected to a speed control 70 which drives a pinion 71 engaging a gear 72 keyed by a coupling 73 to the shaft 65. The shaft is threaded into the coupling and may be disengaged therefrom after loosening the lock nut in the coupling 73 by rotation in a direction opposite to that in which it is normally driven. At a distance from the uppermost extremity of the rotor 61, the foaming and conditioning chamber 21 is substantially closed by a removable cover 74 provided with an aperture 75 to accommodate the shaft 65. The chute 20 extends obliquely from the upper exterior wall of the chamber 21 between the level of the top of the rotor 61 and the cover 74 and is provided with a gate 76 pivoted at 77 to be swung into the open dotted position 78 shown in Fig. 1.

Referring to Fig. 6, a curved baffle 79 extends vertically within the uppermost compartment 80 of the chamber between the plate 67 and the cover 74 and also between the shaft 65 or socket 66 and one side wall of the chute 20, in order to divert the properly conditioned foam out through the chute. The arrows show the flow of latex foam in the compartment 80.

As shown in Fig. 7, an alternative shearing means for the foam comprises a funnel shaped foaming chamber 81 cooperating with a generally correspondingly shaped rotor 82 driven by a shaft 83 which may be raised or lowered as desired. The central portion of the rotor comprises a cylinder 84 terminating in a lower cone 85 and surmounted by an upper truncated conical portion 86. The central portion of the chamber 81 is, like the chamber 21, cylindrical in shape but is surmounted by a funnel 87. The exterior walls of the upper portion 86 of the rotor taper with respect to the interior walls of the funnel 87, so that the space in the channel 88 therebetween becomes progressively less toward the top. By adjusting the height of the rotor 82, for example by adjustment of a lock nut such as shown in the coupling 73 of Fig. 1, the radial dimension of the channel 88 may be controlled as desired so that a coarser or finer foam may be produced with the same number of rotations of the rotor per unit volume of latex foam passing as a column through the channel 88. The shaft 83 extends through the aperture 90 in the cover 91 of this embodiment of the invention. The apertures, 75 or 90, may, if desired, serve for the introduction of unfoamed latex into the latex already foamed by the foaming unit, thereby permitting an increase in density of the final product. In such case the unfoamed latex is thoroughly mixed with the foam by the whirling movement of the uppermost surface of the rotor.

In the embodiment shown in Fig. 8, the shearing chamber 93 is conical in shape and the rotor comprises a cone 94 having a different taper from that of the chamber. Shaft 95 may be driven by suitable means to rotate the cone. Upon adjustment of the shaft downwardly to lower the rotor cone farther into the chamber, the minimum dimension of the channel 96 will be reduced within the limits previously described. It is obvious that in the embodiments of the invention shown in Figs. 2, 7 and 8 the chambers and the rotors are all geometric surfaces of revolution, although this preferred class of shapes need not be adhered to in defining the spaces or channels within which the shearing action takes place within the scope of the present invention.

The ring 40 at the lower portion of the foaming and shearing mechanism 15 (Fig. 1) carries brackets 98 which are provided with holes 99 to receive bolts 100 for securing the mechanism to the horizontal braces 14 of the frame 11. When it is desired to remove the rotor 61 from the chamber 21, the shaft 65 is disengaged from the coupling 73 and the conical portion 62 of the rotor 61 is lowered on to the stop brackets 63 so that the shaft may clear the superstructure of the frame 11. The bolts 100 may be removed and the pipes and conduits 16, 17, 23 and 24 may be disconnected after closing the valves 30, 36, 27 and 28, respectively. The entire foaming and conditioning mechanism 15 may then be removed from the frame, whereupon the rotor 61 may be withdrawn from the chamber after removing the cover 74.

The foaming apparatus according to the present invention is particularly well adapted to the continuous production of sponge rubber articles, such as cushions, mats, mattresses and the like, from a constant supply of originally uncompounded latex. In such a process, latex is supplied from storage tanks to a mixing churn wherein it is subjected to removal of a portion of the stabilizing ingredients such as ammonia, and wherein the desired compounding ingredients, such as accelerators and anti-oxidants, are added. The thus compounded latex is retained at a relatively constant head either in the mixing churns or in storage tanks supplied therefrom, and the rate of flow of a column of latex flowing therefrom is maintained constant to feed the latex continuously into the foaming unit and to insure an even consistency in the foam thereby produced. From the mixing churn or the storage tank associated therewith, the latex is preferably fed in a continuous stream through a straining unit wherein lumps of unassimilated compounding ingredients or of coagulated latex or other extraneous material are removed. The strainer may be of any suitable type which should be easily capable of disassembly for cleaning when necessary.

It is obvious that in order to continuously produce a foam having characteristics such as constant apparent density, uniformity of pore size, and proper distribution of the bubbles within the foam, it is necessary that the rate of flow of the column of latex being introduced into the foaming unit be carefully controlled once the optimum conditions have been ascertained. This control may be effected by suitable means such as the valve 30 in the latex pipe line. For example, if it is found that the foam being produced is too light, that is, that the density thereof is too low, the density may be raised either by introducing less air or introducing more latex. The amount of air bubbling into the latex may be reduced by turning the valve 36 and the flow of latex into the unit may be increased in rate by further opening the control valve 30.

As the latex enters the bottom of the chamber 21 through the entrance pipes 32, it is distributed at a plurality of points so that it flows evenly around the needles 52 to cover the entire floor 33. When the height of the thus continuously formed bank of latex rises above the series of orifices 53, the air being fed through the needles from beneath the floor 33 enters the latex bank as a series of bubbles. The orifices are of capillary dimensions preferably of the order of .010 inch to .020 inch in diameter, their size being maintained sufficiently minute to prevent streaming of the air through the latex in channels. It is preferable that the temperature and humidity conditions of the air being supplied to the pipe 19 be so maintained that any tendency toward drying or coagulating the latex is avoided. This air enters the bank of latex above the floor 33 as small globules which have been found to vary considerably in size and to be larger than the pores desired in the final article after the latex has been coagulated. It is with a view to reducing the size of the bubbles and to rendering them more uniform as well as more evenly distributed, that the subsequent straining and shearing operations are carried out.

The aerating means comprising the nozzles in the form of hollow needles 52 (shown in Fig. 3) have a number of advantages over an ordinary drilled steel plate (shown in Fig. 4) although the latter may be employed, especially when operating on a relatively viscous latex composition. For example, the cost of drilling a two foot steel disc with 1600 holes of the extremely small diameter required is considerable and cleaning operations are difficult. With the aerating unit, shown in detail in Figure 3, the holes drilled in the plates 47 and 48 may be of relatively large dimensions as compared with the needles; and the needles, of the hypodermic needle type, are available commercially at relatively low cost. The insertion of the needles into operable position is easily accomplished merely by forcing each needle through the soft rubber disc 51 between the plates 47 and 48. The soft rubber holds the hollow needles in proper position during the foaming operations and they may be easily removed for cleaning, repair or replacement when the cap unit 39 is swung on the hinge 42. So long as the air pressure is kept at sufficiently high value, such as three and one-half or four pounds, the necessity for cleaning the needles is virtually avoided since the latex has no opportunity to back into the orifices. When the operation of the unit is interrupted, care is taken to maintain the air flow through the needles for a period of time after the latex flow has been stopped. When the level of the latex falls below that of the orifices, the possibility of a back flow of fluid latex to clog the needles is prevented. The projection of the orifices above the level of the floor of the chamber 62 constitutes an additional advantage in this embodiment of the invention, in that when the bubbles are formed substantially out of contact with a continuous metallic surface such as the floor, their tendency to coalesce is reduced.

The initially formed relatively coarse latex foam above described is forced upwardly by virtue of the continuous introduction of latex and air therebelow. The foam passes through the perforations in the plate 58 which act to reduce the density by stripping a certain portion of the liquid from the exterior of the bubbles and to reduce agitation of the latex foam prior to the shearing action. The latex foam is then further forced upwardly as an annular cylindrical column having a length at least equal to its diameter within the space or channel 64 wherein it is subjected to the shearing action of the rotor 61. The rotor 61 presents a constantly moving surface to one face of the column of latex whereas the interior of the chamber 21 presents a stationary surface past which the column of latex travels. While the invention is not predicated upon any particular theoretical explanation of what is herein referred to as the "shearing" action, it is believed that the bubbles travelling in the thin column are subjected to an action which stretches them and subdivides them by virtue of the stationary wall tending by friction to hold them still whereas the moving wall tends to rotate them circumferentially with respect to the chamber. Whatever the explanation may be, the effect of this "shearing" action on the latex foam is to render the foam more homogeneous both as to pore size and as to the distribution thereof, as well as to reduce the mean size of the bubbles originally produced in the foam. The shearing action accomplished by the present foaming unit is to be distinguished from the ordinary whipping or beating action wherein discontinuous surfaces, or successive members, successively come in contact with the latex to introduce air therein. The opposed surfaces defining the shearing space may both rotate in opposite directions, if desired, but they preferably rotate coaxially. Considerable flexibility in the final density and consistency of the foam may be obtained by varying the rate of flow of the latex within the shearing space as well as by varying the speed of rotation of the rotor which may be conveniently accomplished by adjusting the speed control 70. Suitable peripheral speeds for the rotor within a stationary chamber lie between 50 and 500 feet per minute. The finally conditioned latex foam collects in the compartment 80 whence it is forced down the chute 20 and into any desired receptacle for further compounding or for immediate pouring into molds. The consistency and density of the foam being produced may be determined by testing samples taken from the chute 20. If it is desired to change the characteristics of the foam for any reason, such as the production of a definite type of article, this may be accomplished without cessation of the operation of the apparatus merely by adjusting one or more variables, namely, the rate of flow of latex, the pressure of the air, the speed of the rotor, or the height of the rotor shown in Fig. 7 or Fig. 8. The temperature within the chamber may be controlled as desired by introducing fluid of the desired temperature into the conditioning chamber 22. The water content of the gas within the latex foam may also be varied by controlling the humidity of the air entering the pipe 17. The gate 76 may be closed for periodic shutting off of the foam produced even while the foaming operation is continuing as, for example, when changing receptacles beneath the chute 20.

While the apparatus of the present invention have been described in detail with reference to the production of a foam from a liquid latex composition, it is obvious that other foamable liquids may be frothed to the desired consistency in the same manner and with similar apparatus. While an exemplary embodiment of a particular method and apparatus for shearing a foam have been described, it is obvious that other means may be employed to carry out the shearing action so long as a column of foam is passed within a confined space between a plurality of surfaces defining that space, at least one of said surfaces moving relatively to another while the volume of the space remains substantially constant. It is likewise apparent that conventional whipping or beating methods may be employed to produce the initial relatively coarse foam which may then be supplied to and passed through the shearing apparatus. If desired, the aerating means herein described may be employed to produce a final foam without subsequently shearing the foam.

While I have shown and described certain present preferred embodiments of the invention, it is to be understood that it may be otherwise embodied or practiced within the spirit thereof and within the scope of the appended claims.

Having thus described my invention, what I claim and desire to protect by Letters Patent is:

1. In a foam producing apparatus, an aerating device comprising a pair of supporting plates, each of said plates having a plurality of perforations therein which register with corresponding perforations in the other, a resilient member interposed between said plates, and a plurality of hollow capillary needles, each of said needles extending through a perforation in each plate and transfixing said resilient member, being held thereby out of contact with said plates.

2. In a foam producing apparatus, an aerating device comprising a supporting member having a plurality of perforations therein, a resilient member supported by said supporting member, and a plurality of nozzles, each of said nozzles extending through a perforation in said supporting member and through said resilient member, said resilient member holding said nozzles in position free from contact with the walls of said perforations.

3. In a foam producing apparatus, a shearing device comprising a cylindrical chamber, a cylinder within said chamber rotatable co-axially therewith and defining therewith an annular channel having a length at least as great as its diameter, the radial dimension of said channel being of the order of between $\tfrac{1}{16}''$ and $\tfrac{1}{2}''$ and being substantially constant throughout said channel and means for passing a foam axially through said channel.

4. In a foam producing apparatus, a chamber member and a rotor member within said chamber and rotatable co-axially therewith, the operating surfaces of said chamber and of said rotor being co-axial surfaces of revolution defining a channel having a radial thickness between $\tfrac{1}{16}''$ and $\tfrac{1}{2}''$, said chamber having a length at least as great as the diameter of one of said members.

ALEXIS W. KEEN.